350-96.24 SR
XR 3,115,076
REFERENCE
SEARCH ROOM

INVENTOR.
MARTIN L. LEVENE
BY
Attorney

3115076
OR IN 355/1

Dec. 24, 1963 M. L. LEVENE 3,115,076

COMMUNICATION PRINTER

Filed Oct. 30, 1961 2 Sheets-Sheet 2

INVENTOR.
MARTIN L. LEVENE
BY J. C. Whittaker
Attorney 3,115,076
Patented Dec. 24, 1963

3,115,076

COMMUNICATION PRINTER

Martin Lewis Levene, Elkins Park, Pa., assignor to Radio Corporation of America, a corporation of Delaware Filed Oct. 30, 1961, Ser. No. 148,417
5 Claims. (Cl. 95—1.7)

This invention relates to improved apparatus for producing printed records of telecommunications or the like and more specifically to improved apparatus for printing out in a side-by-side array of characters transmitted in serial form.

Mechanical printers are known which receive messages in serial form and print out a permanent record in page format. Probably the best known of such devices is the teletypewriter. Teletypewriters as well as other mechanical printers suffer limitations with respect to the rate at which messages can be printed out as well as with respect to size, weight and mechanical breakdown. For example, the maximum rate at which a teletypewriter can print is about 10 characters per second. In actual practice a rate of about 6 characters per second is often employed in order to limit mechanical wear and breakdown to within practical limits. The slow printing rates of teletypewriters and other mechanical printers make inefficient use of communication channels since messages can be transmitted over such channels at rates far in excess of that at which a mechanical printer can operate.

It is an object of this invention to provide improved communication printing apparatus.

It is a further object of this invention to provide improved electromechanical apparatus for printing at high speeds.

Yet another object of this invention is to provide improved electromechanical apparatus for receiving message information in serial form and for printing out the information at high speeds in line or page format.

It is also an object of this invention to provide improved communication printing apparatus of compact and light weight design.

These and other objects and advantages are attained by the apparatus of this invention which includes means such as, for example, a cathode ray tube for sequentially producing light images preferably in alpha-numeric form. Also included is an optical converter which receives the light images in sequence and projects them onto a photosensitive surface in a linear array across that surface. In a preferred embodiment of the invention, received communication signals are applied to a cathode ray tube kinescope which serially converts the signals into light images of alpha-numeric characters. The character images are focused into an optical tunnel. Coaxial with the optical tunnel there is a rotatable member which carries a light conduit such as, for example, an elongated fiber optic bundle. One end of the fiber optic bundle is aligned with the axis of the optical tunnel for receiving character images therefrom. The other end of the fiber optic bundle is displaced from the axis of the rotatable member and the optical tunnel so that, during rotation, it describes a circle. Adjacent the rotatable member there is one end of an array of fiber optical bundles with the bundles arranged in a circle of the same diameter as is described by the output end of the light conduit. The other or output end of the array has the fiber optic bundles arranged in a line so as to project the character images across a photosensitive surface. By means of this apparatus it is possible to receive character signals in sequence and to print out alpha-numeric characters line by line in page format.

Additional objects and advantages will be evident from the following detailed description which is illustrated in the accompanying drawings wherein.

Similar reference characters are applied to similar elements throughout the drawings.

Figure 1:
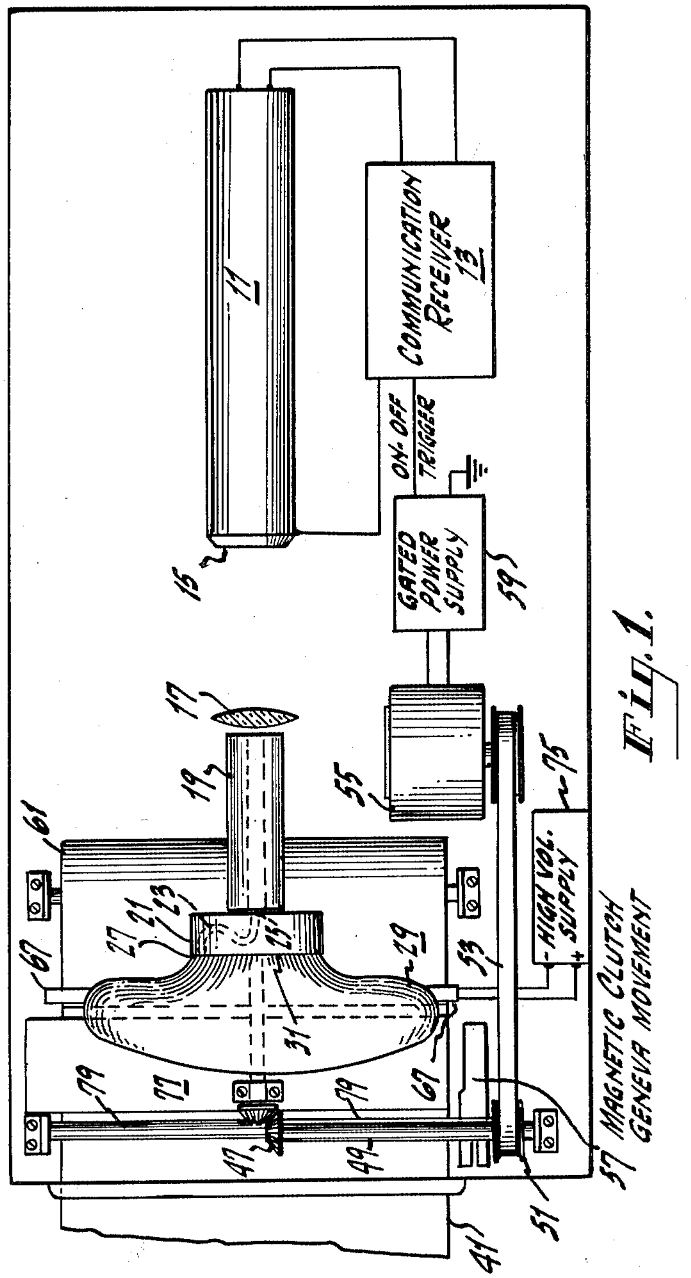
FIGURE 1 is a plan view of a communication printer in accordance with this invention.
Figures 2, 3, 4, 5:
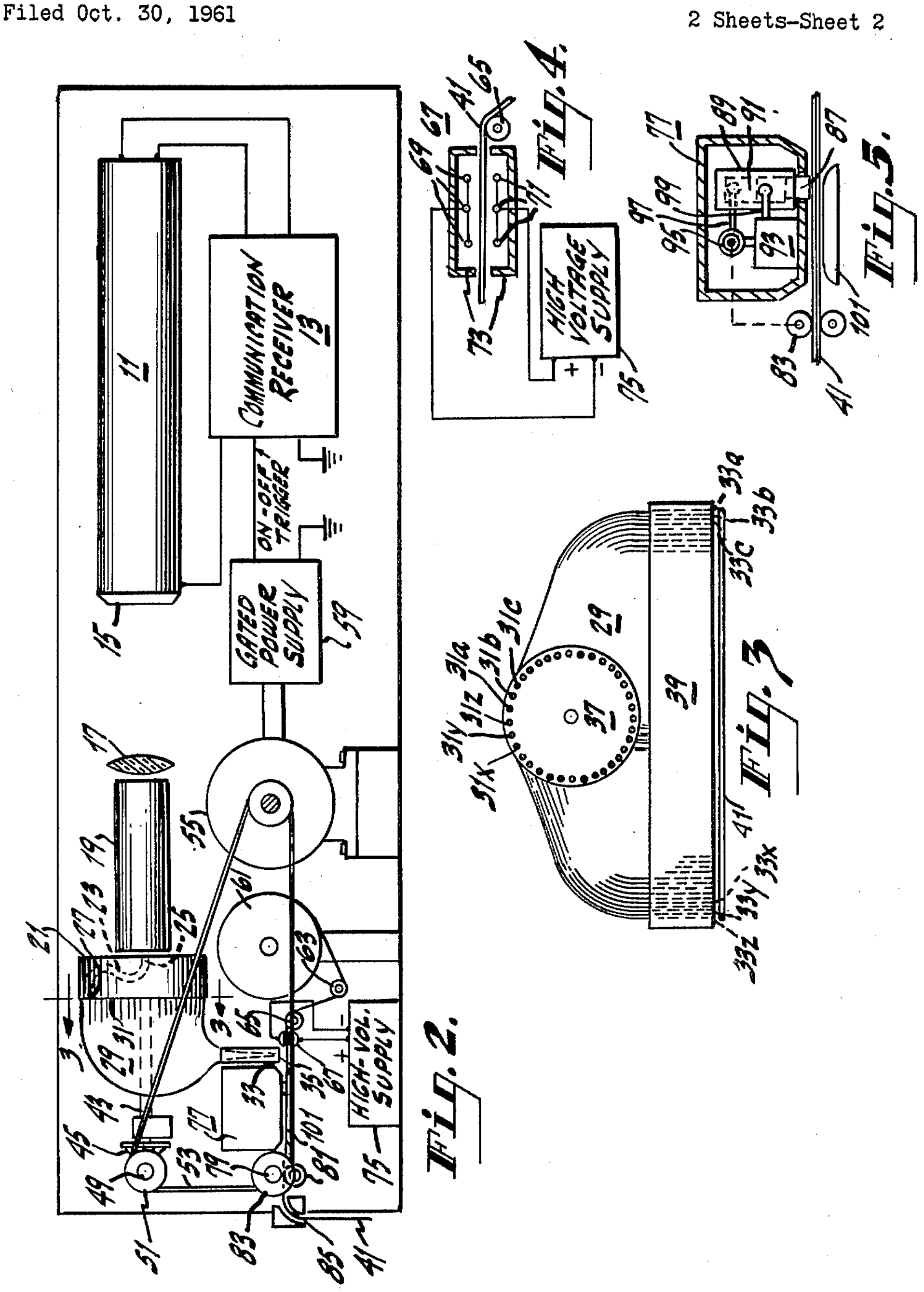
FIGURE 2 is a side elevation of the communication printer of FIGURE 1.
FIGURE 3 is a view of a portion of the apparatus of FIGURES 1 and 2 taken along the line 3—3 in those figures.
FIGURE 4 is a schematic diagram, partly in cross section, of a corona charging unit for use in the apparatus of FIGURES 1 and 2.
FIGURE 5 is a schematic diagram, partly in cross section of a developer unit for use in the apparatus of FIGURES 1 and 2.

A specific embodiment of a communication printer in accordance with this invention is shown in FIGURES 1 and 2 designed to print out messages on electrophotographic paper. Such paper is described in "Electrofax" Direct Electrophotographic Printing on Paper by C. J. Young and H. G. Greig, RCA Review, December 1954, volume XV, No. 4. Such paper is normally made light sensitive by applying an electrostatic charge to its surface. Exposure to light reduces or removes charges from the paper leaving an electrostatic charge image in the unexposed areas thereof. The charge image is then developed by the electrostatic attraction thereto of an electroscopic developer material. Message recording with the printer of FIGURES 1 and 2 need not be limited to printing an electrophotographic paper. Other photosensitive recording media such as silver-halide photographic film or paper could also be employed by substituting appropriate developing means therefor in the printer of FIGURES 1 and 2.

In the printer of FIGURES 1 and 2 a kinescope 11 is employed to convert message signals, applied to it from a communication receiver 13, into alpha-numeric light images. For this purpose the kinescope includes in or on its face plate 15 a font of alpha-numeric characters. Message signals which may be in binary form, are applied to the kinescope 11 to deflect its electron beam to the proper character of the font of the face plate 15. In this way, character areas on the face plate 15 are illuminated serially to provide a message train of light images.

In front of the kinescope face plate there is provided a focusing lens 17 and an optical tunnel 19. Each character illuminated on the face plate 15 is thus focused into and through the optical tunnel 19. At the output end of the optical tunnel 19 there is located a rotatable structure or block 21 coaxially aligned with the optical tunnel 19. Molded into the block 21 is a light conduit comprising an S-shaped fiber optic bundle 23. One end 25 of this fiber optic bundle 23 serves as an input end and is positioned at the axis of the block 21 adjacent the optical tunnel 19 for receiving light images therefrom. The other end 27 of the fiber optic bundle serves as an output end and is located at the opposite face of the block 21 near the periphery thereof.

As the block 21 is rotated, the output end 27 of the fiber optic bundle 23 will describe a circle having a prescribed diameter. Facing the output end 27 as it describes its circle is located an array 29 of additional fiber optic bundles. The input end 31 of this array 29 is arranged in a circle having the same diameter as that described by the output end 27 of the S-shaped bundle 23 and each bundle in the array 29 has the same cross section as the output end 27 of the S-shaped fiber optic bundle 23. Thus each character transmitted through the rotating fiber optic bundle 23 is projected into a successive one of the fiber optic bundles in the circular input end 31 of the array 29. The output end 33 of the array 29 is fanned out into a line at an exposure station 35.

The fiber optic array 29 is shown in more detail in the view of FIGURE 3. In this view a circular block 37 is shown supporting near its periphery the input ends 31 of the fiber optic bundles of the array 29. The output ends 33 of the fiber optic bundles are shown fanned out into a line and supported by a block 39. Characters projected into the input ends 31 are emitted from the array 29 in a single line. For example, a character projected into a fiber optic bundle at 31*a* will be emitted from the output end 33*a* thereof. A character injected at 31*b* will be emitted at 33*b* and so on. Thus, with the fiber optic array 29, a sheet 41 of photosensitized material can be positioned adjacent the output ends 33 of the array 29 to receive and record therefrom, in a single line, characters which have been injected into the circular input end 31 of the array 29.

The block 21, carrying the S-shaped fiber optic bundle 23, is coupled to a drive shaft 43 on which is mounted a bevel gear 45. This gear 45 is meshed with another bevel gear 47 mounted on a shaft 49 driven by a pulley 51 and belt 53 arrangement. The belt 53 is in turn driven by a constant speed motor 55 so that, when the motor is running, the S-shaped fiber optic bundle 23 rotates. Rotational speed is, of course, governed by the message transmission rate. For example, if the fiber optic array 29 is designed with 26 fiber optic bundles and the message transmission rate is 260 characters per second, the speed of the motor 55 will be set so as to drive the rotatable block 21 at 10 revolutions per second. At this speed of rotation of the block 21, in order to reduce smear to a practical value, an exposure time for each character only of about 40 microseconds is selected. In general, when printing out on electrophotographic paper, at least about 36 microseconds are desirable. A criterion, often specified in communication printing, is that printout be accomplished with not more than about 10% smear of each character. This criterion is also met by the apparatus of this invention. For example, using pulsed illumination of each character with a pulse duration of about 36 to 40 microseconds and with the block 21 rotating at 10 revolutions per second, the rotating end 27 of the S-shaped fiber optic bundle 23 will move about 0.01 inch or less during a 36 to 40 microsecond exposure. If the character being printed has a width of $\frac{1}{10}$ inch or more, 10% or less smear will result from movement of the block 21.

Under some circumstances it may be desirable to print out at speeds substantially less than 260 characters per second and with exposure times substantially in excess of 40 microseconds per character. For this purpose, means are optionally provided to drive the block 21 and the S-shaped fiber optic bundle 23 intermittently in order to prevent character smearing. This means comprises a conventional magnetic clutch Geneva movement 57 coupling the pulley 51 to its shaft 49. The Geneva movement 57 will cause the S-shaped fiber optic bundle 23 to advance stepwise around its circle of rotation. Each step of rotation being made in an interval between reception of character signals.

Means are also provided for initiating rotation of the S-shaped fiber optic bundle 23 at the beginning of message reception and for stopping rotation at the conclusion of reception. This is accomplished by a gated power supply 59 which is triggered on and off by start and stop signals from the communication receiver 13. For example, each message reception will begin with a coded on-trigger signal to start the motor 55 and end with a coded off-trigger signal to stop the motor 55.

As mentioned heretofore, message recording can be accomplished by printing out on electrophotographic paper. In FIGURES 1 and 2, a supply of such paper 41 is shown carried on a reel 61. The paper passes from the reel 61, under a tension roller 63, over an idler roller 65 and through a double corona charging unit 67. As shown in FIGURE 4, the charging unit 67 comprises two parallel arrays 69 and 71 of fine wires within a metallic shield 73.

The arrays 69 and 71 are disposed on opposite sides of the electrophotographic paper 41, the array 69 on the recording side being connected to the negative terminal of a high voltage supply 75 and the other array 71 being connected to the positive terminal of the supply 75. Construction and operation of such a double corona charging unit is more fully described in U.S. Patent 2,922,883, to E. C. Giaimo, Jr., issued January 26, 1960.

The electrophotographic paper 41, as shown in FIGURE 2, next passes under the output ends 31 of the fiber optic bundles in the array 29. Here, light images in alphanumeric form are projected onto the paper 41. Wherever light strikes the paper 41 the electrostatic charge thereon, which was applied in the charging unit 67, is dissipated while the unexposed areas on the paper 41 retain electrostatic charge. A visible image is produced on the paper 41 with a developer unit 77 which will be described in more detail in connection with FIGURE 5. Movement of the paper from the supply reel 61 and through the charging, exposing and developing areas is accomplished by means of a pair of pressure rollers 79 and 81. The upper roller 79 of the pair is driven by a pulley 83 and a Geneva movement (not shown) similar to the pulley 51 and Geneva movement 57 previously described. Under control of the pulley 83 and its associated Geneva movement the paper is advanced at least one character line width (preferably more) for each full rotation of the S-shaped fiber optic bundle 23, advance occurring in an interval between character transmission. Start and stop of paper movement is also controlled by the on-off trigger signals applied to the gated power supply 59 from the communication receiver 13. Preferably, a sufficient interval is provided between an on-trigger signal and the message text for the paper 41 to be moved from the charging unit 67 into the exposure position under the output ends 33 of the fiber optic array 29. Between the end of a message text and an off-trigger signal an interval can be provided during which the paper will move past the developer unit 77 and out of the printer through an exit slot 85.

In FIGURE 5 the developer unit 77 of FIGURES 1 and 2 is shown in more detail. The electrostatic image produced on the electrophotographic paper 41 is is developed into a visible image by contacting thereto a pad 87 of absorbent material such as cotton. The pad 87 is soaked with a liquid dispersion of developer particles in a volatile carrier liquid. As the pad 87 contacts an electrostatic image on the paper 41 developer particles are electrostatically attracted from both the pad 87 and the liquid and are thus deposited in image configuration on the paper 41. Since, as described heretofore, the light images projected onto the paper 41 have discharged the image areas thereon, the remaining areas still retain charge. It is preferred, in such a case, that the developer used be a a reversal types, that is, that the developer particles thereof be repelled by the charged areas on the paper 41 and deposit on the discharged areas. A suitable composition for reverse image development on negatively charged paper is as follows:

4 grams carbon black
30 grams dimethyl polysiloxane (viscosity about 2 centistokes)

The carbon black is dispersed in the polysiloxane and the dispersion ball milled in a 2 ounce glass jar for about 40 hours. A reversal type developer concentrate is then made up as follows:

3 grams carbon black dispersion
5 grams of a vinyl chloride vinyl acetate copolymer such as, for example, "Vinylite VYNV" (90% vinyl chloride and 4% vinyl acetate)
30 grams of dimethyl polysiloxane This mixture is again ball milled for about 16 to 40 hours. After ball milling developer concentrate is dispersed in a carrier liquid comprising about equal parts by volume of dimethyl polysiloxane (viscosity 2 centistokes) and trichlorotrifluoroethane. Sufficient concentrate is dispersed in the carrier liquid to provide a final developer composition which includes from about 0.005 to about 6% by weight of developer particles.

In the developer unit 77 of FIGURE 5, the developer pad 87 is mounted in a support 89 which includes a cavity 91 therein with which the pad 87 communicates. A small container 93 is provided for storing a quantity of developer composition. Composition is drawn from the container 93 by a pump 95 coupled to the pulley 83 and is supplied, under slight pressure, to the cavity 91 through a conduit 97. Another conduit 99 returns excess composition to the container 93. In order to maintain a constant slight pressure of the pad 87 on the paper 41 the latter is backed up by a support plate 101 which, preferably includes means (not shown) for vertical adjustment.

What is claimed is:

1. Apparatus for exposing a photosensitive surface to light images, said apparatus including means for sequentially producing a plurality of light images; a rotatable structure including light conduit means, one end of said conduit means being positioned at the axis of said structure; means for sequentially projecting said light images onto said one end of said light conduit means; the other end of said conduit means being adapted to rotate with said structure; and a plurality of light conduit means, one end of said plurality of conduit means being disposed in a circle for receiving light images from the rotating other end of said first mentioned conduit means, the other end of said plurality of conduit means being disposed to project said light images onto said photosensitive surface in a side-by-side array.

2. Apparatus for exposing a photosensitive surface to light images, said apparatus comprising means for sequentially producing a plurality of light images; a rotatable structure; a conduit of light transmitting fibers carried by said structure, one end of said conduit being disposed at the axis of rotation, the other end of said conduit being displaced from said axis for rotation with said structure; means for focusing said light images in sequence onto said one end of said conduit; and an additional plurality of conduits of light transmitting fibers having input ends disposed in a circle for receiving said light images from said other end of said conduit and output ends arranged for projecting said light images side-by-side onto said photosensitive surface.

3. Electrophotographic apparatus comprising: means for sequentially producing a plurality of light images; a rotatable structure including light conduit means, one end of said conduit means being positioned at the axis of said structure; means for sequentially projecting said light images into said one end of said light conduit means; the other end of said conduit means being adapted to rotate with said structure; and, a plurality of light conduit means, one end of said plurality being disposed in a circle for receiving light images from the rotating other end of said first mentioned conduit means, the other end of said plurality being disposed to project said light images onto an exposure plane in a linear array; means for moving a photoconductive insulating surface through said exposure plane substantially perpendicular to said line; means adjacent said exposure plane to apply a substantially uniform electrostatic charge to said surface as it is moved into said exposure plane; and means for applying electroscopic developer material to said surface as it moves out of said exposure plane.

4. Electrophotographic apparatus comprising: means for sequentially producing a plurality of light images; a rotatable structure; a conduit of light transmitting fibers carried by said structure, one end of said conduit being disposed at the axis of rotation, the other end of said conduit being displaced from said axis for rotation with said structure; means for focusing said light images in sequence into said one end of said conduit; and an additional plurality of conduits of light transmitting fibers having input ends disposed in a circle for receiving said light images from said other end of said first mentioned conduit and output ends linearly arranged for projecting said light images onto an exposure plane; means for moving a photoconductive insulating surface through said exposure plane substantially perpendicular to said line; means adjacent said exposure plane to apply a substantially uniform electrostatic charge to said surface as it is moved into said exposure plane; and means for applying electroscopic developer material to said surface as it moves out of said exposure plane.

5. Electrophotographic apparatus comprising: means for sequentially producing a plurality of light images; an elongated tubular member having interior reflecting surfaces; means for focusing said light images into one end of said tubular member; a rotatable structure having its axis aligned with the axis of said tubular member; a conduit of light transmitting fibers carried by said structure, said conduit having one end adjacent the other end of said tubular member and aligned with the axis thereof, the other end of said conduit being displaced from the axis of said rotatable structure for rotation therewith; an additional plurality of conduits of light transmitting fibers having input ends disposed in a circle for receiving said light images from said other end of said first mentioned conduit and output ends linearly arranged for projecting said light images onto an exposure plane; means for moving a photoconductive insulating surface through said exposure plane substantially perpendicular to said line; means adjacent said exposure plane to apply a substantially uniform electrostatic charge to said surface as it is moved into said exposure plane; and means for applying electroscopic developer material to said surface as it moves out of said exposure plane.

References Cited in the file of this patent

UNITED STATES PATENTS

| | | |
|---|---|---|
| 2,653,526 | Perry | Sept. 29, 1953 |
| 2,963,947 | Freer et al. | Dec. 13, 1960 |
| 2,982,175 | Eisler | May 2, 1961 |
| 3,006,259 | Blakely | Oct. 31, 1961 |
| 3,036,153 | Day | May 22, 1962 |